ис011229284B1

United States Patent
Trubacek et al.

(10) Patent No.: US 11,229,284 B1
(45) Date of Patent: *Jan. 25, 2022

(54) FLIP-TOP TABLE FOR PROTECTION FROM PROJECTILES

(71) Applicant: First Line Furniture, LLC, House Springs, MO (US)

(72) Inventors: Richard James Trubacek, O'Fallon, MO (US); Alexander Roland Unger, House Springs, MO (US); Kyle Leonard Kostos, St. Peters, MO (US)

(73) Assignee: First Line Furniture, LLC, House Springs, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/118,982

(22) Filed: Dec. 11, 2020

Related U.S. Application Data

(63) Continuation-in-part of application No. 16/412,697, filed on May 15, 2019, now Pat. No. 10,866,068.
(Continued)

(51) Int. Cl.
*A47B 37/00* (2006.01)
*A47B 13/08* (2006.01)
(Continued)

(52) U.S. Cl.
CPC ............ *A47B 37/00* (2013.01); *A47B 13/081* (2013.01); *F41H 5/18* (2013.01);
(Continued)

(58) Field of Classification Search
CPC ......... F41H 5/18; A47B 37/00; A47B 13/081; A47B 2200/12; A47B 2200/0029; A47B 2200/0036; B60B 33/0002
See application file for complete search history.

(56) References Cited

U.S. PATENT DOCUMENTS

| 4,955,294 A * | 9/1990 | Abe | A47B 17/02 108/6 |
| 5,927,214 A * | 7/1999 | Schwartz | A47B 17/00 108/128 |

(Continued)

OTHER PUBLICATIONS

Product Demonstration: Motion Flip-Top Table [online]. Interior Concepts, Sep. 22, 2016 (screenshots from YouTube video). Retrieved from the Internet: <www.youtube.com/watch?v=Ndian5CvJLE&t=26s>.

(Continued)

*Primary Examiner* — Joshua T Semick
(74) *Attorney, Agent, or Firm* — Creativenture Law, LLC; Dennis J M Donahue, III; Kevin Staed

(57) ABSTRACT

A flip-top table has a tabletop attached to a frame through a pivoting assembly. The tabletop is made from a ballistic-resistant material allowing it to be used as a ballistic shield when it rotates from its horizontal working position to a vertical shielding position. A front modesty panel is also ballistic-resistant and is mounted between the front legs of the frame. A lift speed restrictor is connected between the tabletop and the frame which prevents the user from lifting the tabletop too quickly which could topple the table, and it includes a biasing mechanism that provides a lifting force and helps to hold the tabletop in the shielding position. The table also includes visual indicators that readily indicate to persons around the table that the table can be converted into a ballistic shield. Casters allow one or more tables to be quickly moved and repositioned into a defensive arrangement.

20 Claims, 9 Drawing Sheets

Related U.S. Application Data which is a continuation-in-part of application No. 16/201,099, filed on Nov. 27, 2018, now Pat. No. 10,295,311.

(60) Provisional application No. 62/675,091, filed on May 22, 2018.

(51) Int. Cl.
*F41H 5/18* (2006.01)
*B60B 33/00* (2006.01)

(52) U.S. Cl.
CPC ............. *A47B 2200/0029* (2013.01); *A47B 2200/0036* (2013.01); *A47B 2200/12* (2013.01); *B60B 33/0002* (2013.01)

(56) References Cited

U.S. PATENT DOCUMENTS

| | | | | |
|---|---|---|---|---|
| 6,336,414 | B1 * | 1/2002 | Stewart | A47B 3/0815 |
| | | | | 108/115 |
| 7,066,098 | B2 * | 6/2006 | Blasen | A47B 3/08 |
| | | | | 108/115 |
| 7,975,624 | B2 * | 7/2011 | Henriott | A47B 21/00 |
| | | | | 108/50.02 |
| 8,578,864 | B2 * | 11/2013 | Nyenhuis | A47B 3/00 |
| | | | | 108/115 |
| 9,950,728 | B2 * | 4/2018 | Weiser | A47B 13/021 |
| 10,758,038 | B2 * | 9/2020 | Ruzicka | A47B 7/02 |
| 2014/0158024 | A1 | 6/2014 | Henriott | |

OTHER PUBLICATIONS

Interior Concepts, Motion Flip-Top Tables, Brochure, Feb. 2018, Interior Concepts, Spring Lake, Michigan.

Interior Concepts, Tables—Multi-Purpose Table Solutions, Brochure, Feb. 2018, Interior Concepts, Spring Lake, Michigan.

\* cited by examiner

FLIP-TOP TABLE FOR PROTECTION FROM PROJECTILES

CROSS-REFERENCE TO RELATED APPLICATIONS

This application is a continuation-in-part of U.S. patent application Ser. No. 16/412,697 filed on May 15, 2019 which is a continuation-in-part of U.S. patent application Ser. No. 16/201,099 filed on Nov. 27, 2018 and issued as U.S. Pat. No. 10,295,311 on May 21, 2019 and which claims priority to U.S. Provisional Patent Application No. 62/675,091 filed May 22, 2018, all of which are incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to armored furniture that offers protection from ballistic projectiles, and more particularly to flip-top tables having a table-top and modesty panel formed from ballistic materials and operating as a protective shield.

Related Art

Ballistic shields have long been used for protecting individuals faced with a threat by stopping projectiles. It is generally known to those having an ordinary skill in the art that ballistic shields may be integrated into pieces of furniture which thereby serve multiple uses. Particularly, the pieces of furniture, such as a table, can function as a traditional furniture piece until such a time as when a threat is present and the furniture is then used as a ballistic shield.

Most prior art devices incorporate ballistic resistant material into the standard portions of the furniture. For example, a table that is intended to function as a ballistic shield when a threat is present may have a tabletop surface made from a ballistic resistant material. Additionally, tables having a front and side modesty screen may also use a ballistic resistant material which a person may duck behind when a shooting threat is present. For example, U.S. Pat. No. 8,701,544 describes a desk having desk panels, such as the desktop surface and front modesty screen, made from a ballistic resistant material. Similarly, a book shelf may have a backside made from a ballistic resistant such described in U.S. Pat. No. 9,528,797.

Other known devices not only incorporate ballistic resistant material into the furniture sections but also combine removable and rotating portions wherein the furniture converts from the traditional furniture design to a ballistic shield design. For example U.S. Pat. No. 6,170,379 describes a desk having a removable desktop surface which is intended to be used as a shield when a threat is present. Additionally, US Pat. App. No. 2015/0033990 and US Pat. App. No. 2015/0153143 describe desks that convert into ballistic shields where the desktops rotate into a vertical position and abut a modesty screen attached to the legs of the table and form a single shield.

However, these known devices fail to account for the additional weight of ballistic materials as compared with standard furniture materials or the adrenaline of individuals in high stress threat situations, such with an active shooter threat, which cause individuals to act quickly and with excess force. The '379 Patent presents a particular problem as the removable ballistic shield will generally be heavier than what many people can wield. For example, a 2'×3' tabletop surface made from ballistic materials could be almost one hundred (100) pounds which would not be easily wielded by most individuals, especially elementary school students. Conversely, if the thickness of the panel is reduced to reduce the weight of the shield, it is less resistant to higher caliber projectiles and can be ineffective in many situations.

Known devices that offer pivoting surfaces, such as the '990 application and the '143 application, also fail to accommodate for the increased weight of traditional ballistic material and increased adrenaline present in threatening situations. In particular, these references describe tabletops with pivoting surfaces but do not address the fact that the added weight of the ballistic material and the speed with which the surface will be lifted will likely cause the entire unit to topple over as they are thrown from the table position to the shielding position. In operation, the user will likely being raising the desktop into the shielding position as quickly as possible considering the present threat. As the topside of the desk or table is flipped forward the center of gravity necessarily moves forward and momentum may cause the unit to topple if the momentum is too great which would leave the person(s) vulnerable to the threat without the protection of the shielding surfaces. Additionally, many ballistic materials are heavier than many standard tabletop surfaces used in flip-top tables, and some individuals may find it difficult to lift the tabletop.

These references do not teach or suggest any mechanism to control the lift speed to ensure that the shield does not topple over when a threat is present. Additionally, these references do not have any counterbalance holding the table in the upright position when the desktop is thrown forward into the shielding position. Accordingly, they may lift the desktop with as much force as possible which will tend to be greater than their average force considering the excess adrenaline. Unfortunately, this excess force will likely cause the entire unit to topple forward and render the shield useless. Accordingly, there is a need for a controlled lift of a tabletop that preferably also provides some lift assistance. It would also be beneficial to have a device that biases or locks the tabletop in the shielding position once it is moved to this position to prevent the tabletop from being knocked back down by projectiles hitting the tabletop surface.

Although the table disclosed in the '990 application has longitudinal base supports extending forward of the shield which may require a greater force to topple the unit forward when the tabletop is moved to its vertical position, base supports alone are not sufficient to prevent the table from toppling forward if a person exerts enough force during the lift, which is likely in a high stress threat situation. The ballistic shield apparatus disclosed in the '143 application is designed for attachment to a current desk; it includes a torsion spring that can help with lifting the desktop shield (a gas spring is also suggested) but does not suggest supports forward of the shield and thus the entire unit would likely topple over unless the surface is slowly lifted, which is unlikely to occur when a threat is present. If the ballistic shield apparatus is added to a table that has longitudinal base supports below the legs and which extend forward of the shield, the front shield would not extend below the base supports which would result in a large open, unprotected section at the bottom of the table, and since the front shield of the ballistic shield apparatus is connected to a spacer shield that is attached to the mounting bracket at the topside of the desk, it does not attach to and extend between the legs of the table. Additionally, neither of these references discloses or suggests a lower crossbeam for additional rigidity at the bottom end of the legs.

Another reference that may adequately account for the increased weight and adrenaline associated with the lifting action when a threat is present can be seen in U.S. Pat. No. 9,615,658. This reference describes a pivoting desktop which rotates into a shielding position but which is connected to a chair portion. Accordingly, when the desktop is lifted into the shielding position, it is less likely topple forward where the chair and seated person act as a counter balance and hold the shielding table upright. However, the addition of the chair limits mobility of the table and does not easily lend itself to being moved into strategic positions. Additionally, the chair prevents multiple units from nesting within one another, for example when the units are being shipped and stored.

There remains an issue in these known ballistic table devices because none of them adequately account for the additional weight of traditionally available ballistic resistant material nor the excess force that will be used by individuals in threatening situations along with the ability to quickly move and reposition the tables, even from behind the tabletop when it is in the vertical position with a threat on the opposite side. It would also be beneficial for ballistic tables to be readily identifiable as offering additional protection so that they can be differentiated from ordinary flip-top tables that do not offer ballistic protection. Additionally, while some of the ballistic tables in the prior art are small enough to be lifted to move, such as in the '379 Patent, the '658 Patent, the '143 application, and the '990 application, many ballistic tables and other items of furniture are either fixed to the floor or too heavy to be lifted, such as in the '254 Patent, the '544 Patent, and the '797 Patent, and as indicated in the '254 Patent and '797 Patent, casters are beneficial to more easily move larger items of furniture into a position to maximize their protective effects. For ballistic flip-top tables in particular, the small, liftable tables without casters and the large, fixed tables typically provide protection all the way to the floor, and it would be beneficial for large, flip-top ballistic tables with casters to provide protection down to the floor.

Flip-top tables, or flipper tables, are made by various manufacturers and incorporate some of the same features used in a ballistic flip-top table, such as base supports that extend in front of the legs, lift assist devices, and modesty panels. However, even if the standard tabletop and modesty panel materials are replaced with ballistic-resistant materials, these tables do not include the particular features that are critical for providing ballistic protection. For example, U.S. Pat. No. 3,008,789 by Bradley, U.S. Pat. No. 5,121,697 by Baum, and U.S. Pat. No. 8,359,983 by Williamson describe flip-top tables with a tabletop that pivots from a horizontal position for working thereon to a vertical position for access to a compartment or storage of the table. These standard flip-top tables do not include a ballistic resistant tabletop and modesty panel connected to and extending between the legs nor do they have a lower crossbeam to provide for additional structural support and rigidity. Further, for those standard flip-top tables that have a modesty panel and casters, the modesty panel does not extend down below the wheel axis to the floor which renders the table ineffective for ballistic protection. In operation, the tabletop in the '789 patent pivots relative to the front edge of the tabletop to allow access to a storage compartment of the desk held beneath the tabletop, and the tabletops in the '697 patent and the '983 patent pivot to a vertical position for storage of the tables with the pivot axis being closer to the center of the tabletop than the front edge. As with the other prior art discussed herein, without particular supporting structures and counterbalances for the additional weight of a ballistic tabletop, these references cannot operate as a ballistic shield without changing their principle of operation.

Accordingly, there remains a need for an improved ballistic resistant piece of furniture that can function as a traditional furniture piece and also function as a ballistic shield. Particularly, the improved piece of furniture needs to account for the increased weight of a ballistic shield so that any sized individual can effectively convert it into the shielding position but also necessarily restrict the speed at which it can be converted into the shielding position so that the unit does not topple over. Additionally, the piece of furniture needs to be mobile so that it can be easily moved both during threatening situations as well as in non-threat situations when the furniture simply needs to be moved from storing, cleaning, and other ordinary uses.

SUMMARY OF THE INVENTION

The invention is a piece of furniture, such as but not limited to a table, desk or similar work station with a flip-top tabletop surface, that has ballistic panels that rotate in a controlled manner to serve as a shield against projectiles. In the preferred aspect of the invention, a ballistic tabletop panel is pivotally attached to the frame and rotates between a traditional working position and a shielding position. Accordingly, the tabletop surface can be used as a traditional work surface and pivoted into a shielding position. The table has a front ballistic panel modesty screen that is mounted between the front legs, and an edge of the pivoting surface overlaps the upper edge of the modesty screen when it is rotated into the shielding position. In addition to the pivot assembly allowing the tabletop to rotate between the working position and the shielding position, a lift assist cylinder helps a user pivot the surface into the shielding position and further includes a lift speed restricting mechanism that prevents the user from lifting the surface too quickly. Without the restricting mechanism, a user may lift the surface too quickly and the forward momentum may cause the entire unit to topple where there is no counterbalance attached to the unit. Similarly, a lift assist is necessary where the added weight of the ballistic resistant tabletop may be too heavy for some users to lift on their own. When in the shielding position, the lift assist doubles as a biasing mechanism to hold the tabletop in the shielding position and standoff posts attached to the legs prevent the tabletop from over-rotating and making contact with the modesty panel.

In another aspect of the present invention in the preferred embodiment, the furniture includes a specially color-coded latch mechanism, a color-coded rear edge of the tabletop (i.e., the edgeband facing the user in a seated position), a color-coded top edge of the modesty panel, and color-coded casters to clearly indicate to a person seated at the table or standing around the table that the furniture is made with ballistic resistant panels rather than having structural panels. The color-coded rear edge is readily visible by persons seated at the table with the tabletop in the working position and is also readily visible by persons standing in a room when the tabletop is flipped up into the shielding position. The casters are also readily visible when looking at the bottom of the table. Accordingly, when several tables are in a room, with some tables having standard structural panels while other tables have the ballistic resistant panels, the color indicators are helpful to persons in the room to quickly differentiate between the different types of tables and identify the tables that offer increased protection from projectiles. Alternatively, other indicating indicia can be used in combination with our in place of the preferred color indicator. The furniture can be outfitted with a safety box that would also preferably be marked with the color-coded indicator.

It is another aspect of the table of the present invention to serve the same purposes as a standard flip-top table and for the special modifications described above to serve as a projectile resistant shield in under five (5) seconds. Each table can protect multiple rows of people behind the ballistic panels and can easily be integrated into school classrooms, office and other work environments without disruption to the day-to-day operation of the environment.

Other aspects of the table include an expanded wheelbase, centered modesty panel between the wheels and the lift speed restrictor to control the speed and force as the top is rotating. The lift speed restrictor also adds additional stability to the top when it is in the upright position to keep it from folding back into the table position when a projectile hits the shield. Further, custom plates that consist of a rolled rod and bearing system allow the table top to easily rotate and integrated handles minimize the kit of parts.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, FIGS. 1-7, that are provided on ten (10) drawing sheets.

DETAILED DESCRIPTION OF THE PREFERRED EMBODIMENTS

Figure 1A:
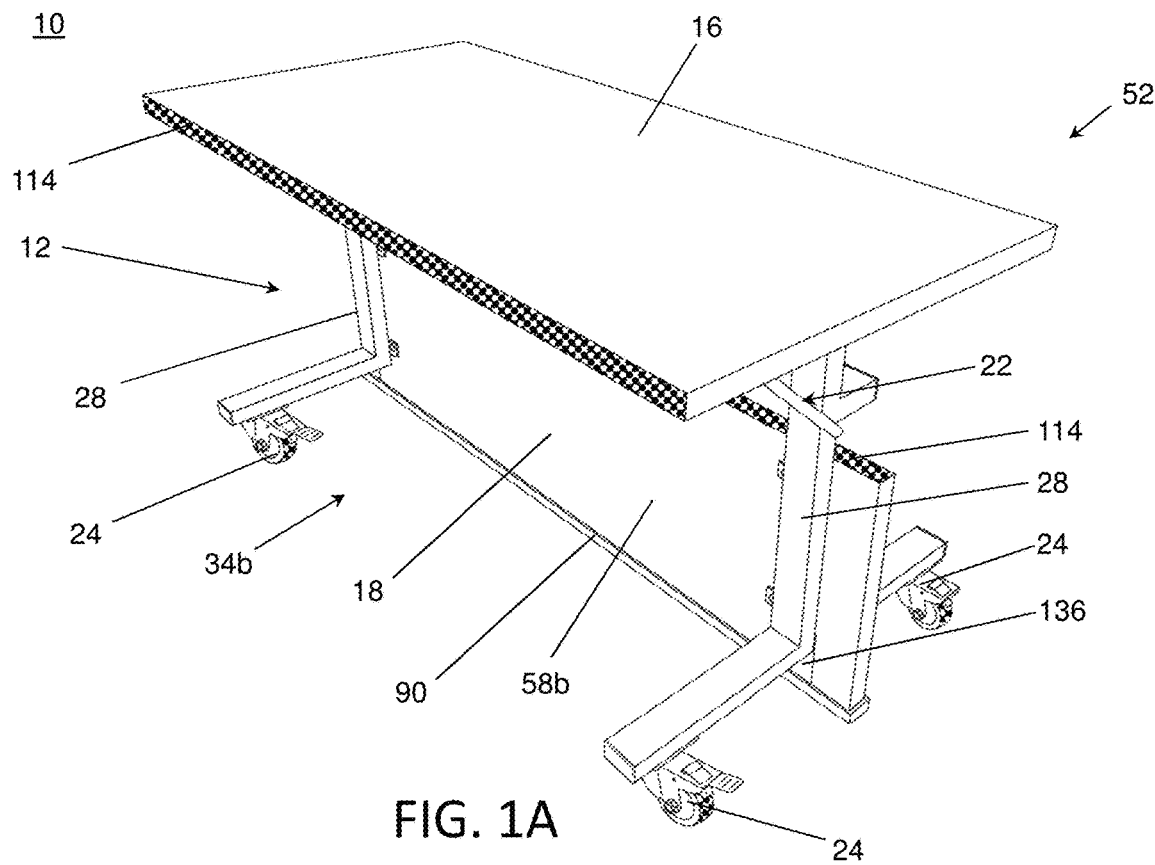
FIGS. 1A-1B are rear and front perspective views, respectively, of the ballistic shielding table in the working position according to the invention described herein.

The following description of the preferred embodiment(s) is merely exemplary in nature and is in no way intended to limit the invention, its application, or uses.

The invention described herein is a piece of ballistic shielding furniture and more particularly a table 10 having a projectile resistant tabletop 16 and modesty panel 18 connected to and extending between a pair of legs 28. The tabletop is designed quickly flip upwards from its working position 52 into a shielding position 54 by releasing a locking mechanism 20 on the underside of the tabletop and rotating upwards to become a ballistic shield that may protect multiple rows or groupings of people from various ballistic projectiles, such as bullets fired from guns as well as shrapnel and other fragments blasted by an explosive device. The table is generally made up of a projectile resistant tabletop structure and modesty screen, a frame 12 supporting the tabletop and modesty panel, a pivot assembly 14 connecting the table top to the frame, an actuator 22 with a combined lift assist and lift speed restrictor 22a and casters 24 that allow the entire table to be readily moved and repositioned either by itself or with other anti-ballistic tables into a defensive arrangement.

The frame 12 is preferably made from a solid single piece steel frame having a pair of vertical legs 28, a base 32 with a pair of longitudinal supports 84 attached to one end of the legs and at least one crossbeam 30 connected between the pair of vertical legs. The legs are perpendicular to the crossbeam, and the longitudinal supports are perpendicular to the legs and the crossbeam. Steel support plates 92 preferably connect a pivot assembly 14 to an upper crossbeam laterally extending between and connected to the proximal ends of the vertical legs 78a, opposite from the distal ends 78b connected to the base. Accordingly, the pair of legs are connected to one another by the upper crossbeam which supports the tabletop and pivot assembly and have a height 80 that may vary relative to the type, size and intended user of the work station. For example, a desk intended for use in an elementary school will have shorter legs than a desk being used in a business setting. However, these desks will operate in the same fashion as described herein. Alternatively, the support plates are removed, and brackets alone connect the tabletop to the pivot assembly and provide support when the table is in the working and shielding positions described below.

Opposite from the upper crossbeam, a lower crossbeam may be connected between the pair of base supports and laterally extend there between. Similarly, one or more additional cross members may span the distance between the vertical legs to provide additional support to the frame and may also provide mounting positions for the modesty panel. In the preferred embodiment, a lower crossbeam having a support tray 90 is offset from the upper cross beam and attached to frame beneath the longitudinal supports on the front side of the legs and upper crossbeam. In in this embodiment the lower crossbeam has a panel support tray that supports the modesty panel wherein the bottom edge of the panel is seated within the tray.

Figure 3A:
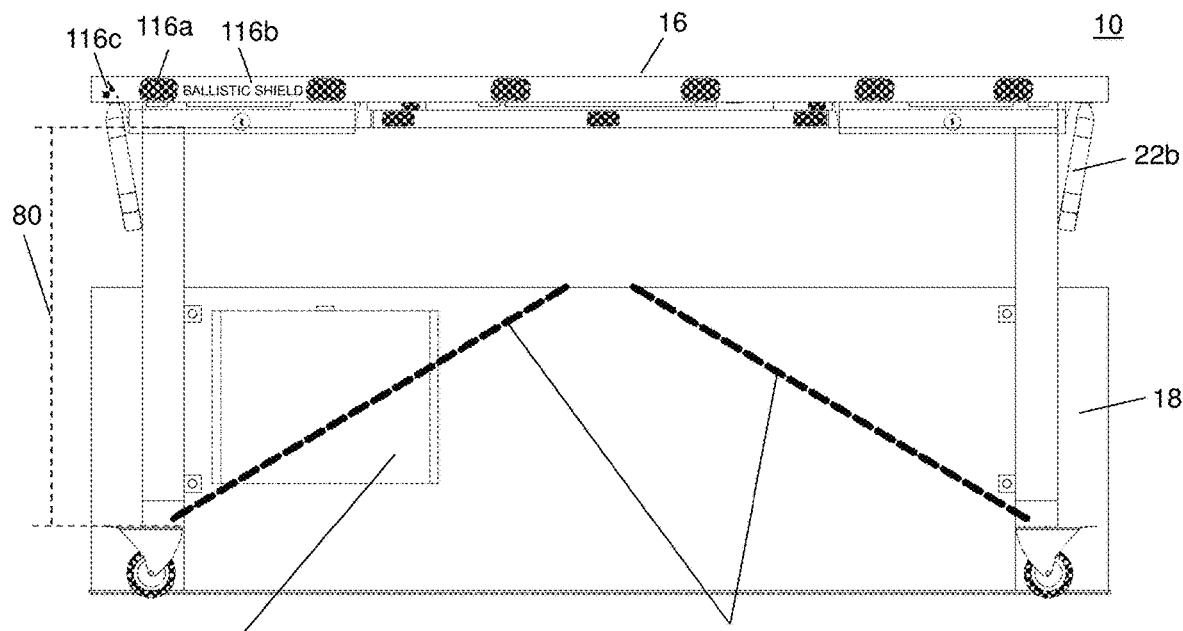
FIG. 3A-3B are rear views of the ballistic shielding table in the working position and shielding position, respectively, according to the invention described herein.

In an alternative frame design, the lower crossbeam may be replaced or used in addition to a truss frame, as shown by the dashed lines in FIG. 3A. In this alternative embodiment, angled supports 118 can connect from the distal ends of the legs to the top edge of the modesty panel and additional fasteners can be used along the truss supports to hold the modesty panel. Further, it will be appreciated by those having an ordinary skill in the art that other cross members could be used.

The longitudinal supports of the base are attached to the distal ends of the legs and extend between a front end 120a on the frame's front side 34a and a rear end 120b on the frame's rear side 34b. To adequately support the tabletop and provide a sturdy base, the supports have a length 86 that is approximately equal to the height of the legs in the preferred embodiment. However, in other embodiments with higher tabletops and other types of top panels, such as a podium or a standing work station, it will be appreciated that the supports may be shorter than the leg height.

Each of the supports has a set of casters 24 at the feet of the supports that make the table very mobile and which may also be locked to hold the table in place. Preferably, each longitudinal support has a pair of casters at opposite ends with one caster attached on the front side of the leg and the other caster on the rear side of the leg. In such an embodiment the rearward casters 24b lock with caster locking mechanisms 122 while the forward casters 24a do not lock whereby a person does not have to go to the front side 34a of the ballistic shield to unlock the front casters when a threat is present but can remain on the rear side 34b of the ballistic shield table to unlock to rearward casters to move and reposition the table when the table is in its working position or in its shielding position. Additionally, if the tabletop is lifted upwards into the shielding position to quickly, the forward casters will cause the entire table to roll forward as the center of gravity moves forward and thus further prevent toppling. The casters may also be motorized or electronic and work in an autonomous fashion to link more than one table together through a wireless system or network.

Figure 2A:
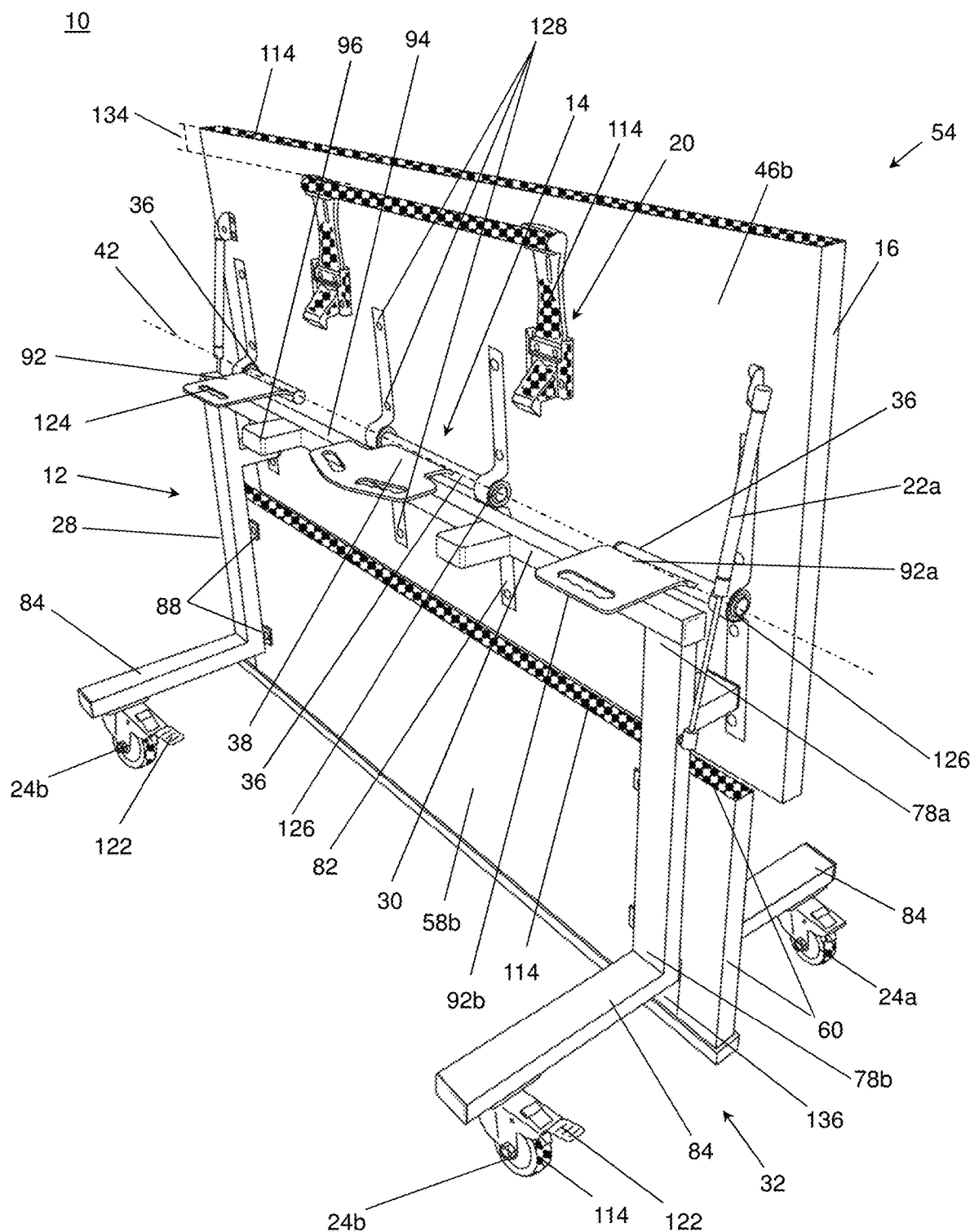
FIG. 2A-2B are perspective views, respectively, of the ballistic shielding table in the shielding position according to the invention described herein.

The frame 12 also has a set of handles 124 attached to the topside 94 of the upper crossbeam opposite from the pivot rod which allows an individual to easily maneuver the table to always face the threat, as shown in FIG. 2A. It also allows the table to be fully mobile in all directions and used as a mobile shield for first responders or even a battering ram as well allowing the table to be easily removed for cleaning or similar purposes. As in U.S. Pat. No. 9,010,254 which is incorporated by reference herein, when the tabletop is in the shielding position, the table can be used to block a doorway. The tabletop is further supported in the preferred embodiment with steel support plates connected to the topside of the lateral crossbeam. When used the pivot rod of the pivot assembly is integrally formed with the front edge 92a of the support plate. Similarly, the handles may be integrated into rear edge 92b of the support plates rather than directly attached to the crossbeam. To provide adequate support, the support plates extend past the crossbeam on both the front and rear side of the frame and have a length 76 that is at least twice the width of the tabletop.

Figure 8A:
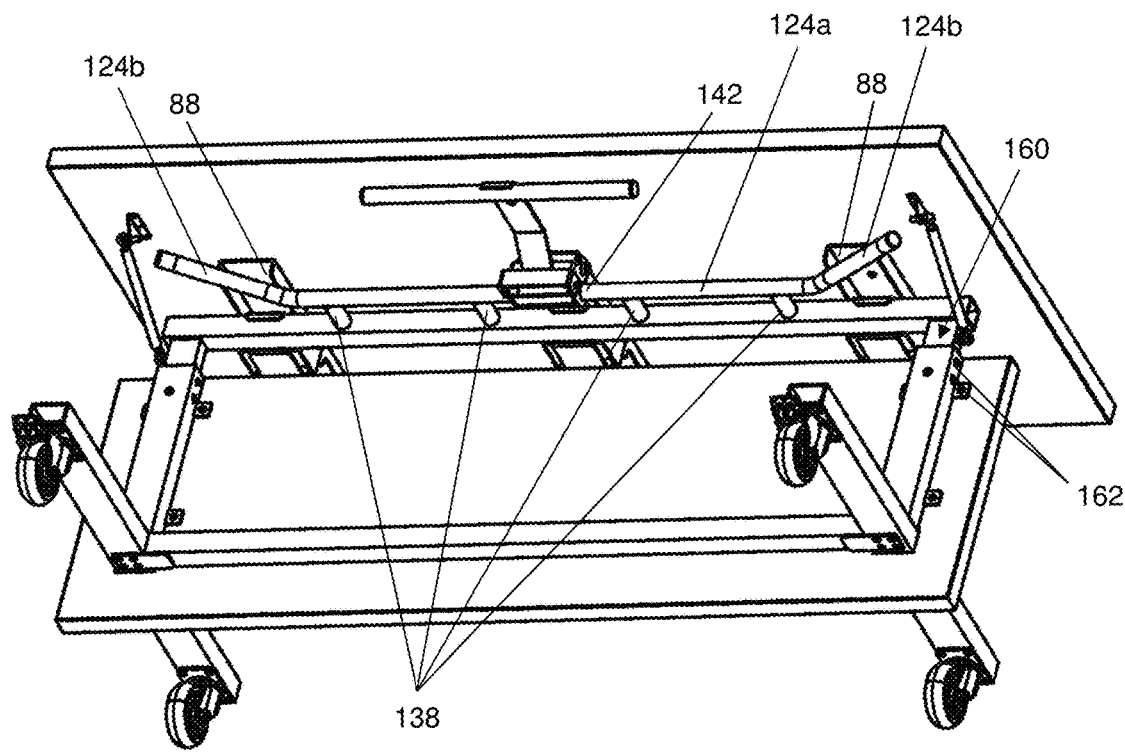
FIGS. 8A and 8B are upward-looking and downward-looking perspective views of another embodiment of the ballistic shielding table in the working position and in the shielding position, respectively, according to the invention described herein.
Figure 8B:
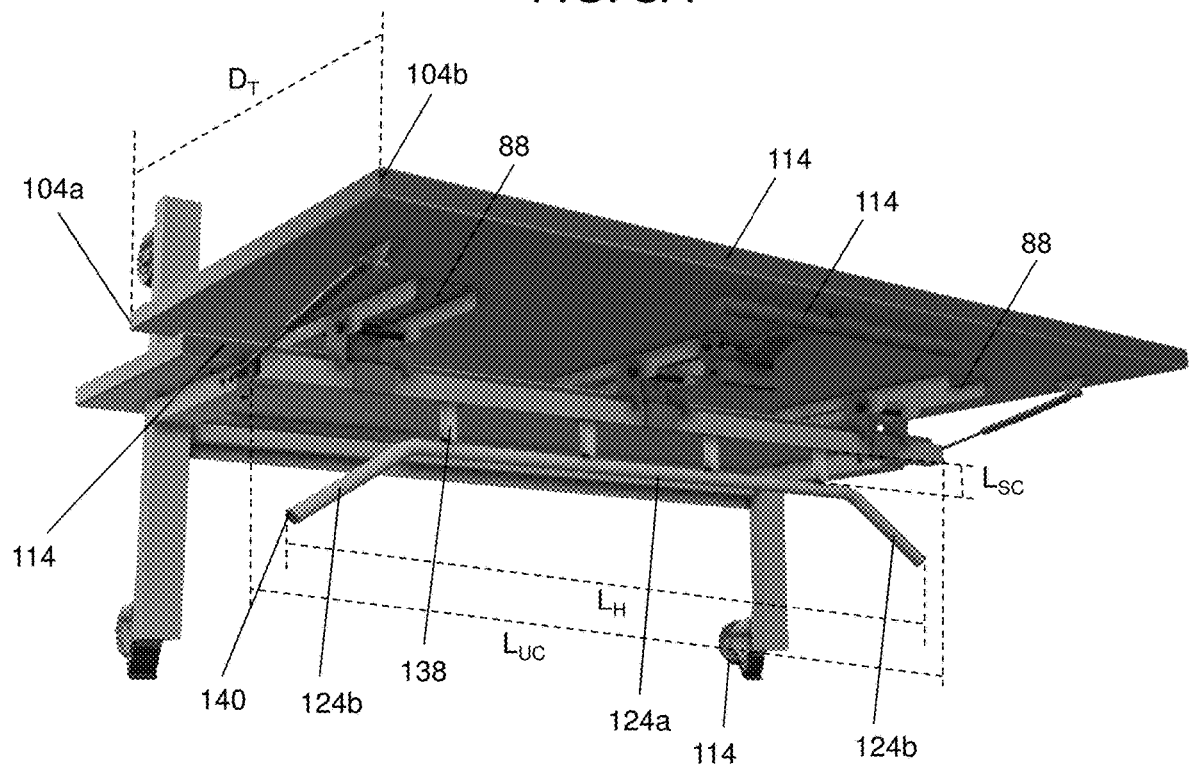

In the embodiment shown in FIGS. 8A and 8B, the handle is elongated and tubular in shape and is attached to the rear edge of the upper crossbeam and through several standoff connectors 138 that position the handle a distance towards the rear edge of the tabletop, i.e., spaced the standoff connector length ($L_{SC}$) from the rear edge of the upper crossbeam. Although the size and the shape of this alternative handle design is not intended to be limiting, it is preferred that the handle length ($L_H$) is greater than the tabletop distance ($D_T$) between its front edge 104a and its rear edge 104b and is less than the length of the upper crossbeam ($L_{UC}$), i.e., $D_T<L_H<L_{UC}$. Additionally, opposing end sections 124b of the handle are preferably angled further away from the rear edge of the upper crossbeam toward the rear edge of the table in the working position to a point where the distal ends 140 of the handle's end sections are positioned more than twice the distance of the standoff connector length which provide additional clearance between the crossbeam and the handle's end sections and facilitate easier movement of table itself where multiple gripping positions that are offset from the longitudinal axis of the crossbeam are provided. As particularly depicted in FIGS. 8A and 8B, this alternative handle design has a center section 124a that is parallel to the crossbeam with opposite end sections angled away from the ends of the center section towards the rear of the tabletop.

It will also be appreciated that the handle can provide the catch that engages the locking mechanism in the working position as further described herein. As shown and described with regard to the preferred embodiment, a catch extends from the crossbeam and the locking mechanism engages the catch to hold the tabletop in the working position. In comparison, as shown in FIG. 8A, the locking mechanism may engage a portion 142 of the center section of the handle and thereby remain in the working position until the locking mechanism releases the catch and the tabletop pivots into the shielding position. In the embodiments shown in FIGS. 8A and 8B, there is no tray below the modesty panel to help support its weight; instead, there are mounting brackets 88 on both sides of each leg to which the modesty panel is attached with fasteners. It will also be appreciated that for even more support, additional mounting brackets could be connected to and spaced along the length of the lower crossbeam. Regardless of the particular support structures used to hold the modesty panel in place, as with the other embodiments of the present invention, the bottom section of the modesty panel extends below the wheel axis for each of the casters.

Figure 4A:
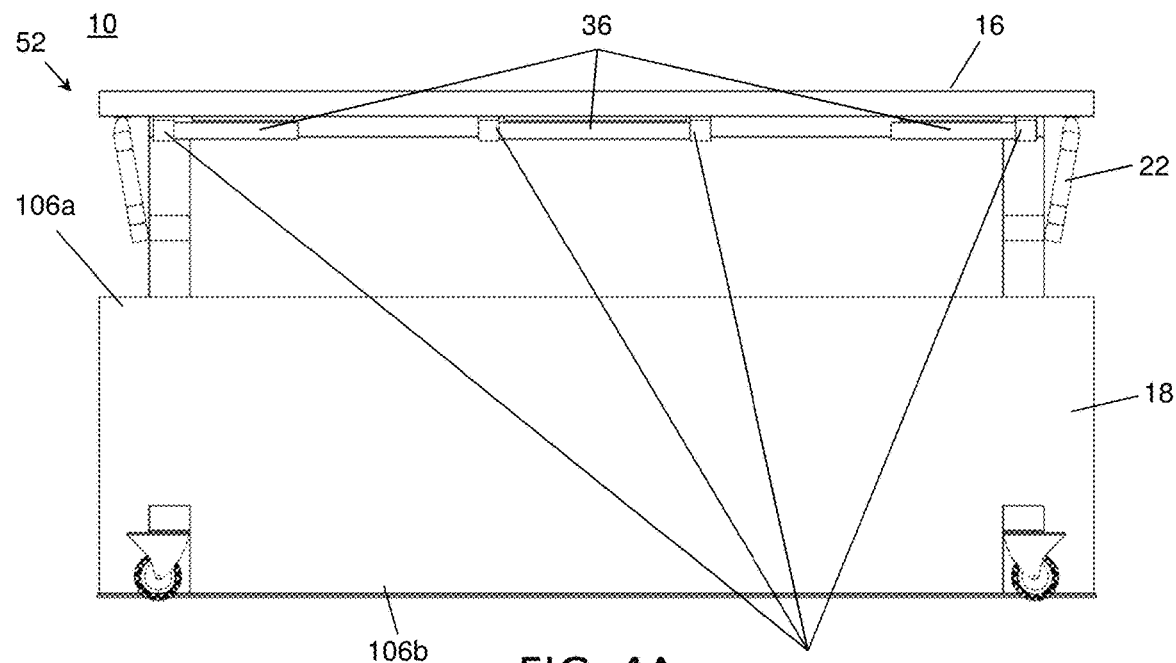
FIGS. 4A-4B are front views of the ballistic shielding table in the working position and shielding position, respectively, according to the invention described herein.
Figure 4B:
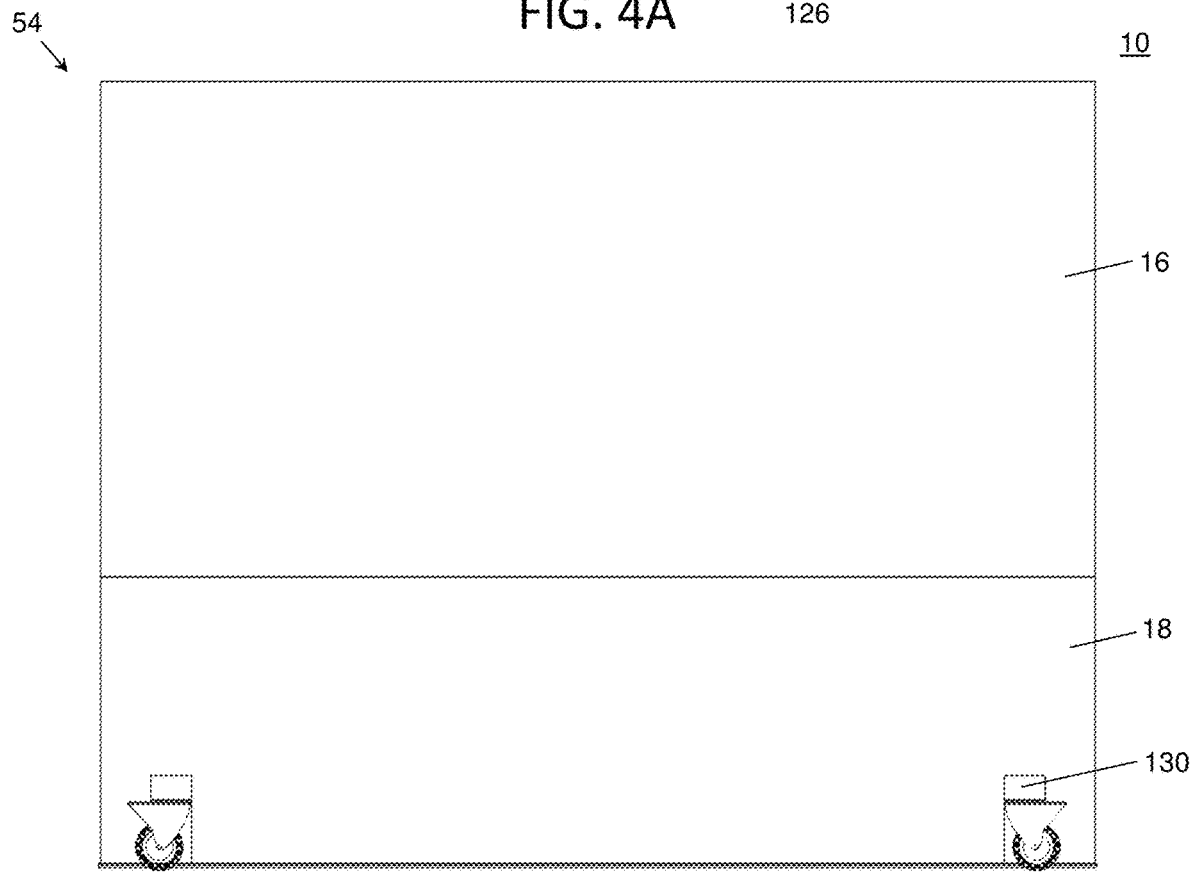

The pivot assembly 14, which allows the tabletop to rotate between the working position and the shielding position, is connected to but offset from the upper crossbeam on the front side of the frame. The pivot assembly includes a pivot rod 36 and pivot mount 38 which engage mounting brackets 82 that are connected to the underside of the tabletop with a set of fasteners 128 as shown in FIG. 2A. In operation, the pivot rod provides an axis 42 of rotation offset from the crossbeam as the pivot rod is spaced a distance 40 from the crossbeam on the front side of the frame. In the preferred embodiment, the offset distance is equal to approximately one half the length of the support plate, but it will be appreciated that the offset distance may vary relative to the size and weight of the tabletop. The pivot rod can be a continuous rod or may have multiple rod sections, such as a pair of rod side sections and a rod center section as shown in the drawings. Bearings 126 on ends of the pivot rod preferably provide a smooth and easy action when raising and lowering the top tabletop. As particularly shown in FIG. 4A, the bearings can be located on opposite ends of the rod center section and at the outside ends of the rod side sections adjacent to the legs. Further, although three (3) separate pivot assemblies are used in the embodiment illustrated in the Figures, it should be appreciated that a single pivot assembly with an elongated rod or additional pivot assemblies may also be used.

The tabletop 16 is a planar body surface 44 having an underside 46b and topside 46a separated by the width 50 of the tabletop and a perimeter edge 48. When assembled, one portion of the tabletop and edge is on the front side of the frame and another portion and edge is on the rear side of the frame. In the preferred embodiment the weight of the tabletop is evenly distributed on either side of the lateral crossbeam but sixty (60) percent of the tabletop is rearward of pivot axis. However, it will be appreciated that other embodiments may have various weight distributions relative to the size and shape of the tabletop.

Figure 2B:
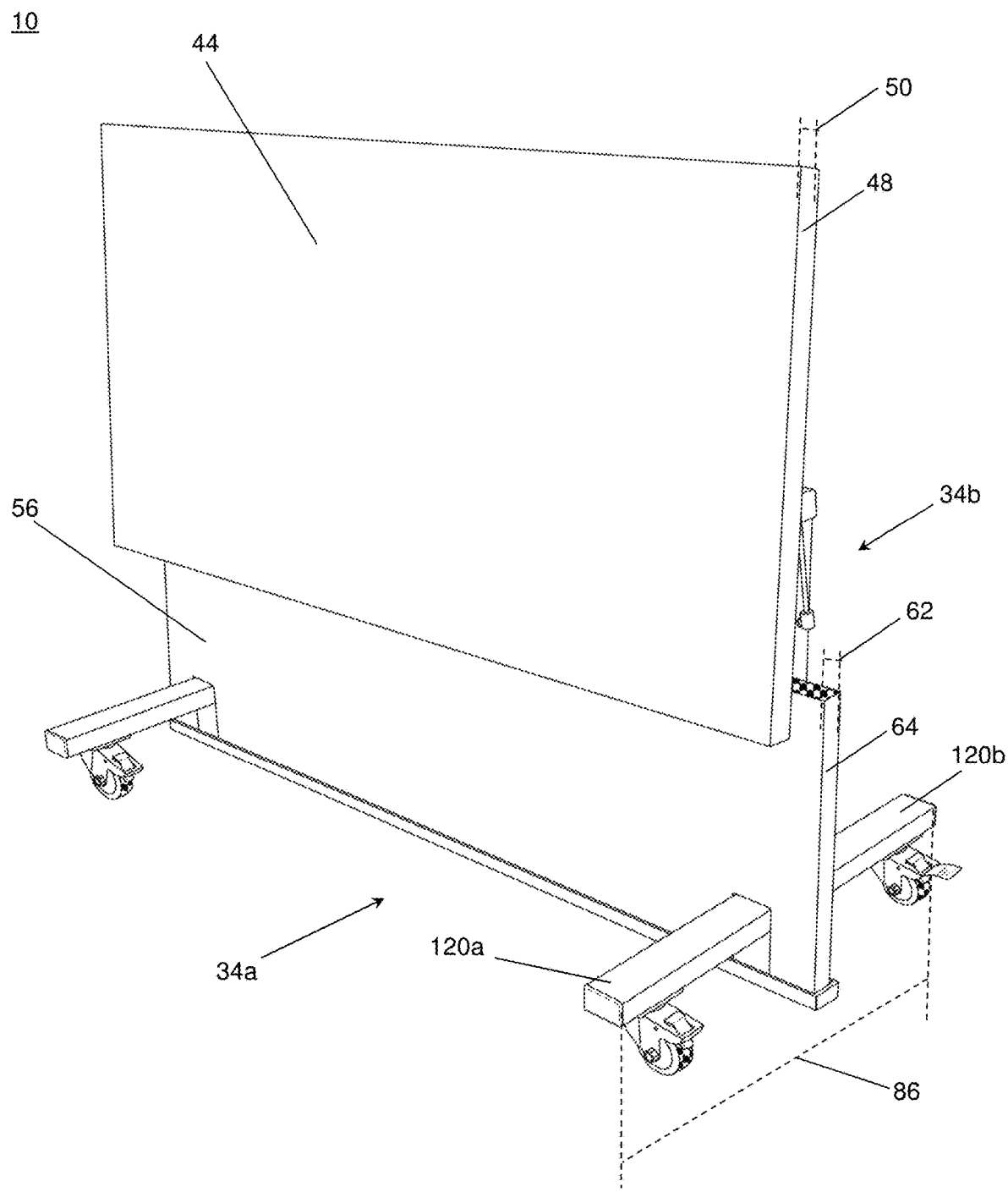
Figure 3B:
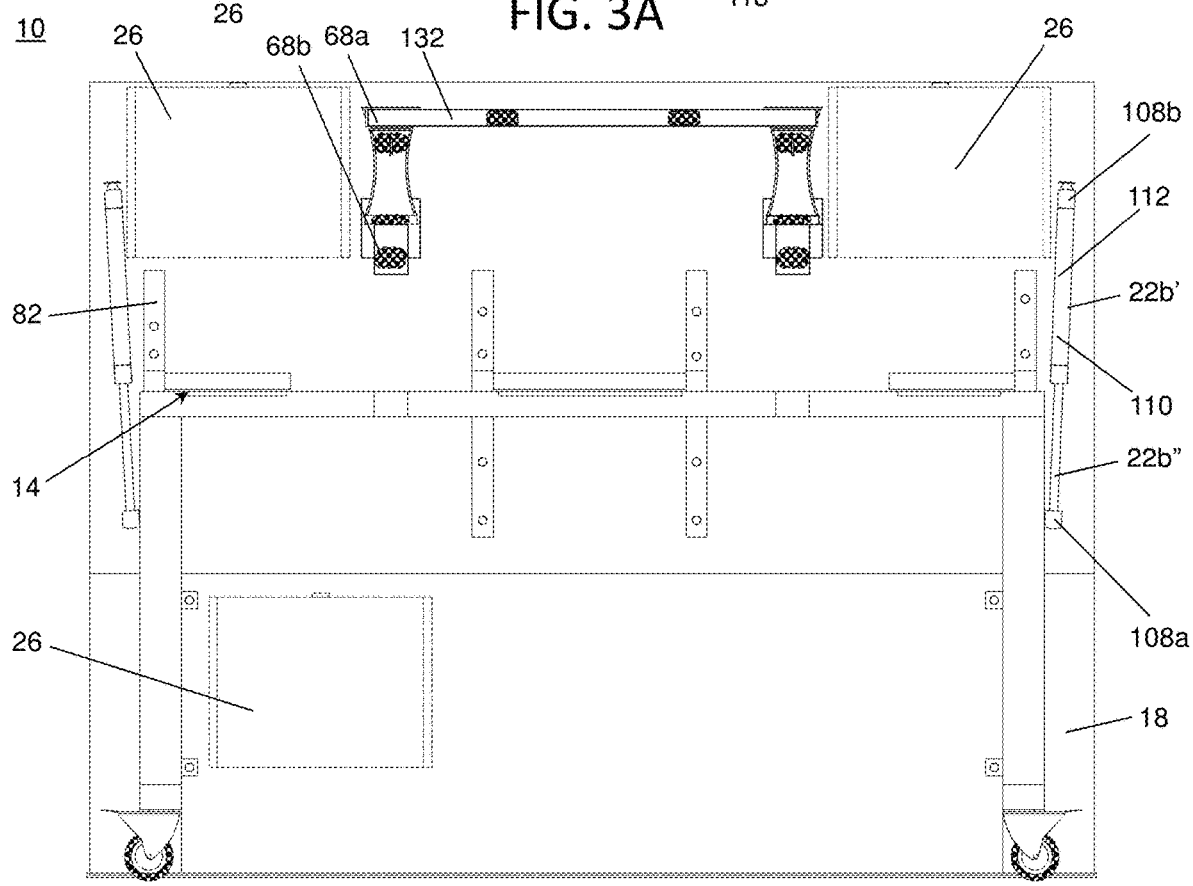

Although the preferred tabletop has a rectangular shape with a front edge 104a on the front side of the frame, a rear edge 104b on the rear side of the frame and a pair of side edges longitudinally extending between the ends of the front and rear edge, it will be appreciated that the tabletop may have various shapes including but not limited to a circle and an oval. To attach the tabletop to the frame a set of mounting brackets are connected to the bottom side which operatively engage the pivot rod of the pivot assembly as described above. Accordingly, the tabletop pivots along with the pivot assembly between the working position 52 and the shielding position 54. As shown in FIGS. 2B and 3B, the mounting brackets have a length that is greater than half the height of the legs and extend between the front edge and rear edge of the tabletop to provide further support the tabletop in addition support plates.

Standoff posts 98 are attached to the front of each leg and protrude past the modesty panel to keep the tabletop from over rotating and hitting the modesty panel when moved to the shielding position. Accordingly, the length 100 of the standoff posts is greater than the width of the modesty panel and is preferably equal to the distance of offset between the pivot rod and crossbeam so that the pivot axis and standoff posts are within the same plane. A portion of the tabletop mounting brackets attached near the legs of the frame provide a bump stop when the tabletop is in the shielding position and prevent the standoff post protruding from the front of the legs from damaging the underside of the table. Accordingly, the length of the mounting brackets 102 on the underside of the table at least extends to the standoff post and is preferably greater than at least half the length of the legs. Other embodiments of the mounting brackets may also include fasteners or biasing members that assist the lift assist mechanism in holding the tabletop in the shielding position. For example, a magnetic connection can be used between the end of the standoff post and the mounting bracket to hold the tabletop in the shielding position.

Figure 1B:
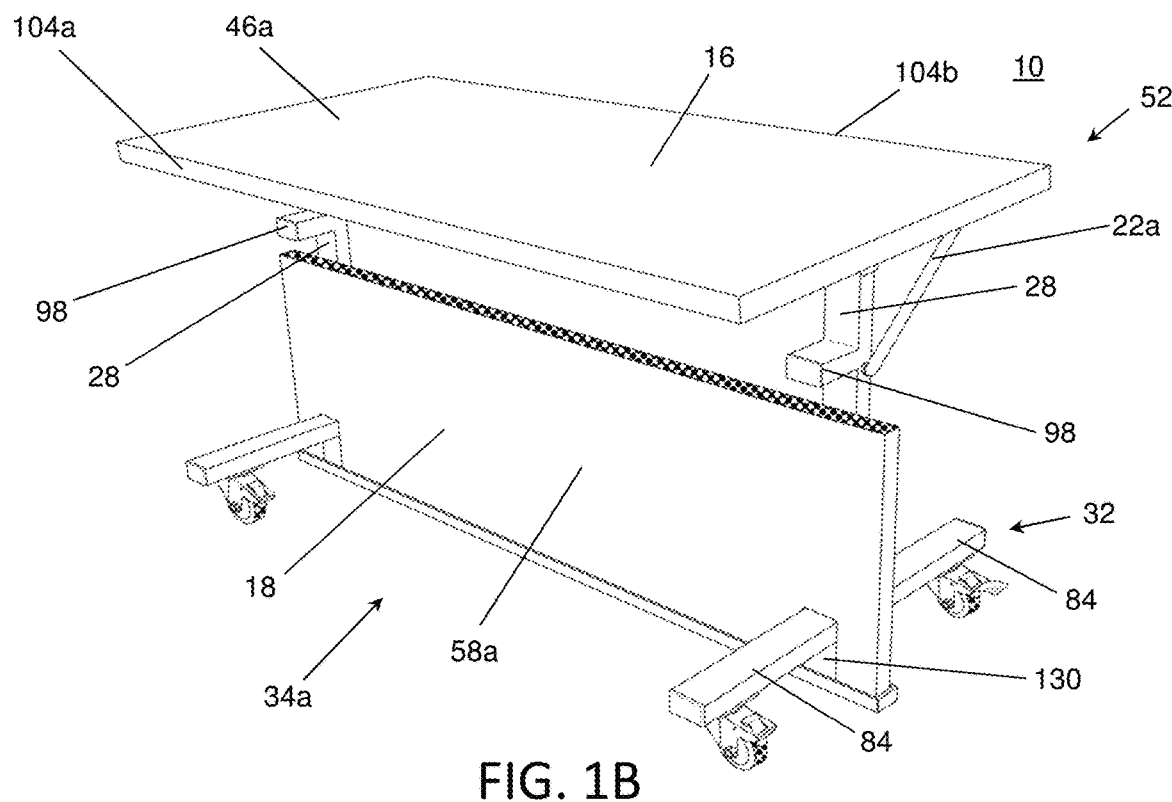

In addition to the tabletop attached to the upper crossbeam, a modesty panel 18 is connected between the legs of frame as particularly shown in FIGS. 1A and 1B. Like the tabletop, the modesty panel is substantially planer with a front surface 58a and a rear surface 58b separated by a panel width 62 and has a perimeter edge 60. As with the tabletop described above, the modesty panel body 56 is preferably rectangular having a bottom edge 106b proximate to the floor, a top edge 106a separated a distance ($D_M$) from the bottom edge and a pair of side ends 64 that are proximate and connected to the legs of the frame with a series of mounting brackets and fasteners described below. However, unlike the tabletop, the modesty panel does not pivot and instead is permanently affixed between the pair of legs.

Figure 5A:
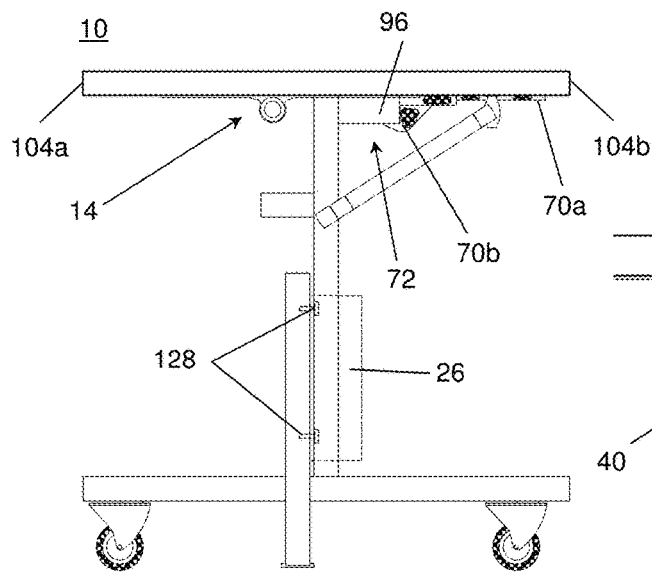
FIG. 5A is a side view of the ballistic shielding table in the working position with the latching locking mechanism locked according to the invention described herein.

The modesty panel is connected to the frame by a set of fasteners 128 which extend through mounting brackets 88 on each leg that engage a mounting portion near the side edges of the modesty panel, as shown in FIGS. 2B, 3 and 5A. Additionally, in the preferred embodiment the bottom edge of the modesty panel is seated within the tray 90 of the lower crossbeam which supports the weight of the panel and further ties the frame together to provide additional strength to the table. Preferably, the gap between the bottom edge of the modesty panel and the ground is no more than ¼ inch.

Figure 6:
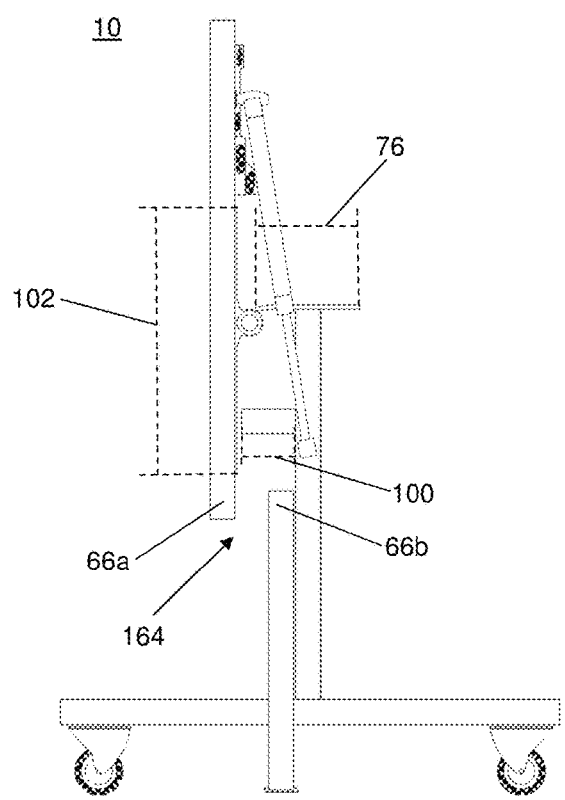
FIG. 6 is a side view of the ballistic shielding table in the shielding position according to the invention described herein.

As discussed above, the lower crossbeam is connected to the base of the frame and is offset on the front side of the frame to allow the modesty panel to mount on the front side of the legs as particularly shown in the FIGS. 1B, 5A and 6. As the longitudinal supports of the base extend forward of the modesty panel, the panel also includes c-channel cutouts 130 to allow the base supports to extend through the panel. To ensure the modesty panel does not have any openings where a projective could get through, c-channel inserts can be used and inserted into the open portions of the c-channel. Further, although these cutouts are provided for easier assembly of the table in the preferred embodiment, it will be appreciated that an alternative embodiment may have a solid modesty panel with an aperture through which the longitudinal supports extend. It will also be appreciated that the bracket or other connector 136 that attaches the lower crossbeam with tray 90 to the longitudinal supports can fill the entire cutout space from the longitudinal supports to the tray.

In the truss frame design discussed above, the lower crossbeam may not be included and the modesty panel itself may extended closer to the ground wherein the gap between the bottom edge and the ground is no more than a ¼ inch. In this embodiment the modesty panel is free floating without support on the bottom edge and therefore is only attached to the frame by the series of fasteners along the legs of the frame. To provide additional support multiple brackets may extend from the truss supports and additional fasteners can be used to securely attach the modesty panel to the frame. However, it will be appreciated that the preferred embodiment incorporates a lower crossbeam in place of additional fasteners wherein fasteners, such as screw, necessarily embed into the panels and potentially create weak points within the panel itself and render it less effective at stopping projectiles. Accordingly, it is preferred to limit the amount of fasteners used to connect the tabletop and modesty panel to the frame.

The invention described herein has two general positions, namely a working position and a shielding position. In the working position the tabletop is substantially horizontal and positioned perpendicular to the vertical legs of the frame where the table functions as standard work station, such as shown in FIGS. 1A and 1B. It will also be understood that the working position may have an angled tabletop, for example in the case of a drafting table and that the horizontal orientation is merely exemplary of the preferred embodiment. When a threat is present, the table can be converted into a ballistic resistant shield wherein the tabletop is pivoted by the pivot assembly into a vertical position that is substantially parallel to the vertical legs. In the shielding position a portion of the tabletop 66a overlaps 164 a portion of the modesty panel 66b, as particularly shown in FIGS. 2B and 6, allowing the table to act as a ballistic resistant shield without any gaps between the shielding tabletop and modesty panel.

Figure 5B:
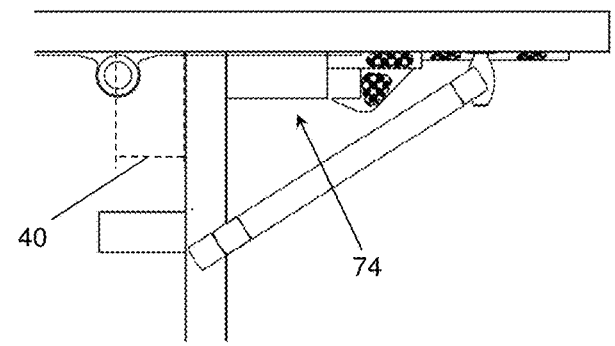
FIG. 5B is a detailed side view of the ballistic shielding table in the working position with the latching locking mechanism unlocked according to the invention described herein

In operation, the user need only release the locking mechanism 20 holding the tabletop in the working position to lift the tabletop into the shielding position. The preferred locking mechanism is shown in operation in FIGS. 2A and 5 wherein the locking mechanism is connected to the underside of the tabletop panel. The locking mechanism is made up of a handle 70a on the proximal end 68a positioned proximate to the rear edge of the tabletop and a latch 70b on the distal end 68b proximate to the crossbeam. When in the locked position 72, shown in FIG. 5A, the locking mechanism engages a catch 96 extending from the rear side of the crossbeam at a fixed end to a free end spaces a distance therefrom and prevents the pivot assembly from rotating about the pivot access. Accordingly, the locking mechanism can be unlocked 74 by pulling the handle causing the latch to disengage the catch as shown in FIG. 5B. Subsequently the pivot assembly, along with the tabletop connected thereto, can freely rotate into the shielding position.

Conversely, when the tabletop is rotated back into the working position, the latch is biased back into the locked position and the tabletop is automatically locked. Although it is preferred that an L-shaped catch extends from the crossbeam to engage the latch, it will be appreciated that other locking mechanisms can be used which may engage the crossbeam or another portion of the frame, without a catch. In operation, the locking mechanism is biased in the locked position where actuating the handle moves it into the unlocked position and allows the tabletop to rotate. In the preferred embodiment, a pair of locking mechanisms are spaced from the centerline of the tabletop, and their handles are connected by a center bar 132. The bar is situated close to the rear edge of the tabletop, preferably within a distance 134 to the edge that is less than or equal to the handle's width, so that a person sitting at the rear of the table could easily reach under and grab hold of the bar to actuate the locking mechanisms.

As described herein, the user need only unlock the locking mechanism and lift the tabletop into the shielding position when a threat is present. However, as explained in the background section above, threatening scenarios carry with them increased adrenaline which may cause a user to quickly lift the tabletop causing the entire unit to topple forward and thus rendering the shield useless. Accordingly, another aspect of the ballistic resistant table is a lift speed restrictor 22a having a restriction mechanism 112 which prevents the tabletop from being lifted too quickly and thereby ensures the shield will be operational. Additionally, the lift speed restrictor includes a biasing mechanism 110 that exerts a force on the tabletop to not only assist a user in pivoting the tabletop into the shielding position but also to hold the tabletop in the shielding position once it is vertical. As shown in FIGS. 5A and 6, a pair of lift speed restrictors have an end 108a attached the legs of the frame and an opposite end 108b connected to the bottom side of the tabletop.

Persons having an ordinary skill in the art will recognize that the preferred lift speed restrictor is a gas charged lift support 22b commonly used in office overhead cabinets, car hoods, and car hatches/tailgates, to create energy by compressing gas inside a cylinder. When closed, the energy is stored and subsequently released when opened. It will also be appreciated that "lift speed restriction" is not the intended purpose of traditional gas lift supports. Instead, the gas lift supports and other types of telescoping pneumatic actuators are generally used to bias something in an opened position. Although the gas cylinder is also used to bias the tabletop towards the shielding position in the present invention, it also functions as a speed restrictor wherein the tabletop rotation is slowed by energy within the cylinder as the tabletop is lifted and then subsequently biased in the shielding position after the tabletop is fully rotated. Accordingly, to return the tabletop to the working position the user will necessarily have to overcome the biasing force.

Other embodiments of a lift speed restrictor may include a spring or combined electronic actuator and restrictor 22c, but the preferred embodiment described herein includes a gas lift speed restrictor 22b which may be referred to as a gas spring in the vernacular of the furniture industry. In embodiments having a spring actuator slowing the lift speed, it will be appreciated that a second locking mechanism is preferably incorporated to lock the tabletop in the shielding position. Accordingly, a pneumatic gas strut with a chamber section 22b' a telescoping rod 22b" is preferred where it not only restricts the lift speed during rotation of the tabletop but also biases the tabletop into the shielding position without an additional locking mechanism. Further, the gas strut also helps to bias the tabletop remain in the shielding position when projectiles hit the front panel and subsequently exert a force pushing the shield backwards towards the working position. The bottom side of the tabletop could include a latch that rotates down to engage the top of the modesty panel or standoff posts to assist the biasing member holding the tabletop in the shielding position and prevent projectiles from pushing over the raised tabletop.

Figure 7:
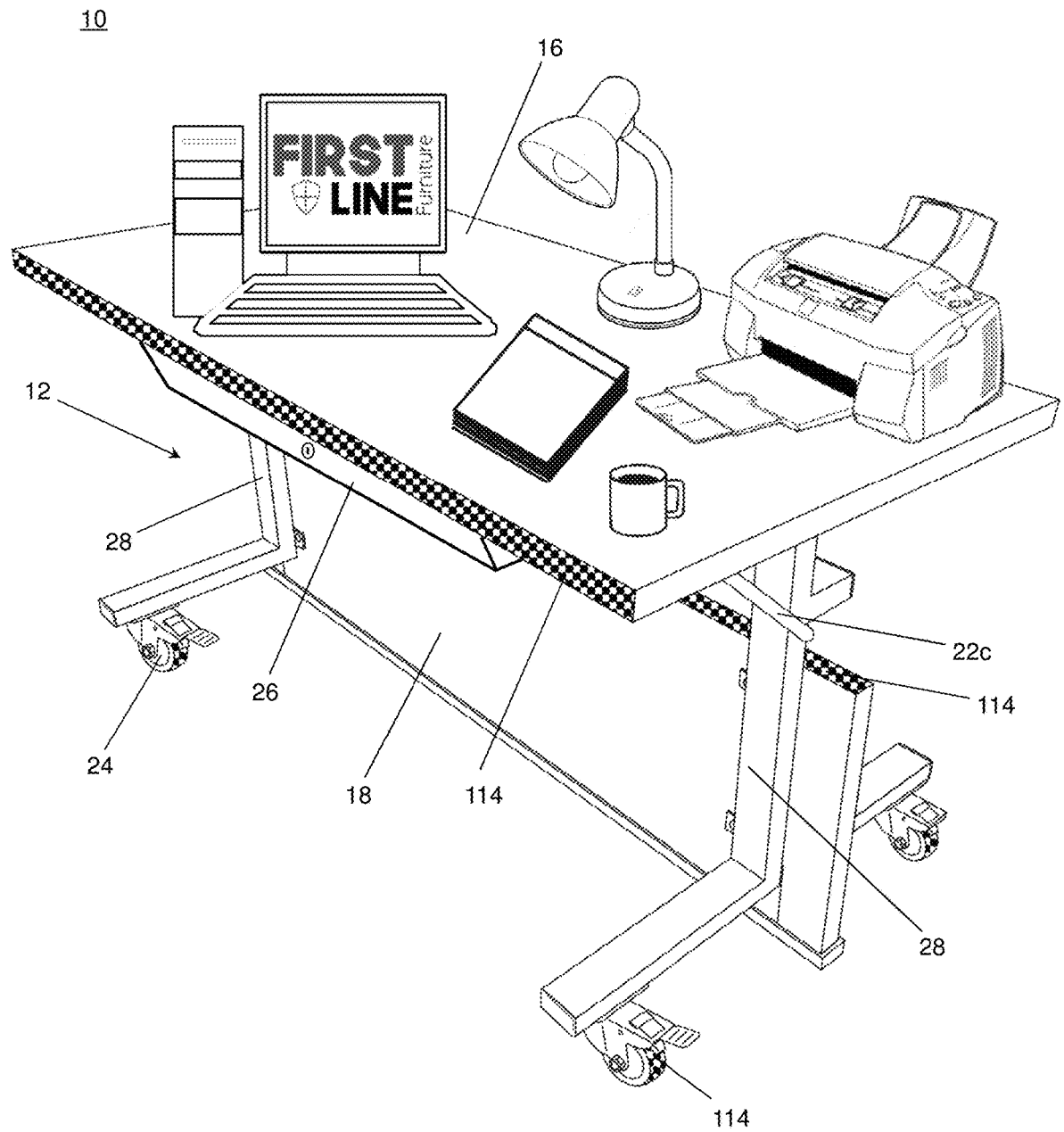
FIG. 7 is a rear perspective view of the ballistic shielding table described herein having a traditional work station on the tabletop thereof.

The tabletop according to the preferred embodiment is 30"×60" and is made from a ballistic material having a weight of 15.2 lbs/square foot for a 1½" thick panel. Accordingly, the preferred tabletop weighs approximately one hundred-ninety (190) pounds and has a weight distribution of 50% on either side of the lateral crossbeam and 60% of the weight on the rear side of the pivot axis. To adequately restrict lift speed during lifting and bias the tabletop forward in the shielding position with approximately one hundred fourteen (114) pounds on the side being lifted and seventy-six (76) pounds as a counterbalance on the other side of the pivot axis, the gas strut exerts a force between fifty (50) pounds and twenty-four (24) pounds but preferably exerts a force of thirty-four (34) pounds. Accordingly, the force exerted by the lift speed restrictor relative to the weight of portion of the tabletop being lifted is preferably 3:1 but may vary between 2:1 and 4:1. Further, as a tabletop typically has numerous objects thereon, as shown in FIG. 7, the lift assist mechanism must provide sufficient force to overcome the additional weight of these objects.

For other tabletop arrangements, such as a desk or a council table in which the front panel is close to the front edge of the tabletop and the axis of rotation would be further from persons seated wherein 90% or more of the weight distribution may be on the rear side of the pivot axis, an even higher rated lift assist and restrictor may be desired, such as one rated for one hundred fifty (150) pounds. It will also be appreciated that multiple lift speed restrictors and assist devices could be used, such as with devices on each side of the frame. Additionally, it will be appreciated by those having an ordinary skill in the necessary force exerted by the lift speed restrictor will vary relative to the size of the tabletop, weight of the tabletop and distribution of mass. For example, a lighter ballistic material on a 30"×60" will necessarily require less lift speed restriction force than that of the preferred embodiment described above.

As lightweight ballistic materials continue to be developed for buildings, furniture, and other hard-shell structures, such materials can be incorporated into the present invention and the necessary force applied by the lift speed restrictor may vary. Hard-shell armor for protection from high caliber projectiles had initially been formed from metals, but it is extremely heavy and can be ineffective. More recent hard-shell armor panels are formed from composite laminate materials, such as ceramics and ceramic composites, and can include a para-aramid backing such as Kevlar®. Additionally, polyethylene and monolithic based hard armor plates have been more recently developed and are lighter than ceramic types of hard armor, but these newer materials are also more expensive. Hard-shell armor plates can be made from a para-aramid base, such as Kevlar®, which is then coated in a tough thermoplastic resin.

Another aspect of the present invention are ballistic shield indicators 114 that notify a person sitting at the table that it can be converted into a ballistic resistant shield. In the preferred embodiment at least one of a color indicator 116a, a word indicator 116b and a shape indicator 116c are printed on the modesty panel, tabletop and casters (preferably at least the faces and sidewalls of the wheels) so that the indicators are visible in the working position. Preferably, the color indicator is an orange hue, such as "tangerine tango" (Pantone color 17-1463 TCK), which will identify the piece of furniture as ballistic resistant. The color indicator is preferably a vibrant hue, such as neon shades on a color palette.

The furniture preferably includes a specially color-coded latch mechanism, a color-coded rear edge of the tabletop (i.e., the edge facing the user in a seated position) and top edge of the modesty panel along with color-coded casters to clearly indicate to a person seated at the table or standing around the table that the furniture is made with ballistic resistant panels rather than having standard structural panels. The color-coded rear edge is readily visible by persons seated at the table with the tabletop in the working position and is also readily visible by persons standing in a room when the tabletop is flipped up into the shielding position. The casters are also readily visible when looking at the bottom of the table which can be viewed from any perspective direction around the table. Accordingly, when several tables are in a room, with some tables having standard structural panels while other tables have the ballistic resistant panels, the color indicators are helpful to persons in the room to quickly differentiate between the different types of tables and identify the tables that offer increased protection from projectiles.

It will be appreciated that other indicia may be used to identify the protective tables, such as a series of stripes and/or text that could be helpful to persons with colorblindness or ridges or other projections on the rear edge that could form braille text for persons who are blind, and the color-coding or other indicia can be used at other locations on the table surfaces, such as color-coding on the back side of the modesty panel or braille on the tabletop. Visual indicators that serve as the ballistic shield identifier, such as a color indicator, a word indicator, or a shape indicator, are preferably placed on surfaces that have different orientations from each other and that are at different heights. For example, when the tabletop is in its horizontal orientation, the rear edge of the tabletop is in a vertical orientation at the top of the leg height while the top edge of the modesty panel is in a horizontal orientation below the top of the leg height. The rear edge of the tabletop is primarily visible from behind the desk whereas the top edge of the modesty panel and the wheels on the casters can be viewed from different perspective directions around the table. The color-coded latch mechanism which is also at the top of the leg height can be viewed from different perspective directions around the table when the viewer is crouched low with eyes below the tabletop whereas the wheels are at ground level and are visible when the viewer is standing up or crouched low. When the tabletop is vertical, the wheels on the casters can still be viewed from different perspective directions around the table, and the latch mechanism is moved to an upper height above the top of the legs where it is prominently visible from behind the table and at the sides of the table.

One or more key-locked safety boxes 26 or drawers can be mounted to the underside of the table top, directly to the frame or to the backside of modesty panel. The safety boxes can hold lifesaving items such as first aid, mace, firearms, and similar items. Like the table itself, the safety box can also have indicia to easily identify it as a containing lifesaving items. As shown in FIGS. 3A and 3B, brackets can be used to mount the safety boxes on opposite sides of the locking mechanisms' center bar. For locking mechanisms that do not have a bar between the locking mechanisms, a center key-locked drawer can be mounted to the underside of the tabletop, such as shown in FIG. 7.

One of the benefits of mounting a safety box to the frame or the backside of the modesty panel is the safety box will not rotate upwards into its shielding position with the tabletop so it can be readily be accessed when the tabletop is horizontal and when it is vertical. For safety boxes that are mounted to the underside of the tabletop, the design of the safety box may grant access from the side of the box opposite to the tabletop. This access side would be at the bottom when the tabletop is horizontal so it would not be as functional as a safety box that is mounted to the frame, but when the tabletop is vertical, the access side would be facing back to the person(s) behind the shield so this would provide access when it is most critical. For a tabletop-mounted safety box, the access side opposite to the tabletop would also avoid a delay in rotating the tabletop from the working position to the shielding position that might be necessary to permit access to a safety box which has an access panel facing the tabletop's back edge because when the tabletop is vertical, the back edge is rotated up to the top.

The present invention further has an intentionally undersized frame relative to the tabletop and modesty panel so that the outer edges of the top and modesty panel can be overlapped with other tables to create a longer, continuous wall of protection. Additionally, it is an aspect of the invention describe herein to allow the tables to be nested together in the shielding position to create a double barrier when a threat is present as well as allow the table sot be easily stored together and takin up less space.

As detailed herein, the present invention provides a ballistic shield that may protect multiple rows or groupings of people from various ballistic projectiles, such as single or multiple bullets fired from weapons which generally travel along a vector from the muzzle of the firearm towards the target. Furthermore, another aspect of the present invention is to provide a solid shield without any breaks, slots or apertures between the tabletop and the modesty panel in the shielding position to effectively prevent shrapnel and other fragments that are blasted by an explosive device at an irregular vector from passing through a space between the tabletop and the modesty panel, thereby further protecting from injury the persons or groups of people behind the ballistic shield. Similarly, the solid shield devoid of gaps and spaces between the tabletop and modesty panel also improves the shielding effect against aggressors who may be continuously moving as the discharge their weapon.

As shown in FIGS. 9 and 10, the underside of the tabletop proximate to its front edge 66*a* contacts the upper section 66*b* of the modesty panel section proximate to its top edge when the tabletop is rotated into the shielding position so that all gaps or spaces between the modesty panel and the tabletop are eliminated in the shielding position. Similarly, the bottom section 144 of the modesty panel extends below the longitudinal axis 146 of the longitudinal supports to further eliminate gaps or spaces between the ground and the bottom edge 106*b* of the modest panel. As particularly shown in FIGS. 3-6, 9, and 10, the bottom section of the modesty panel extends below the wheel axis for each of the casters.

Figure 9A:
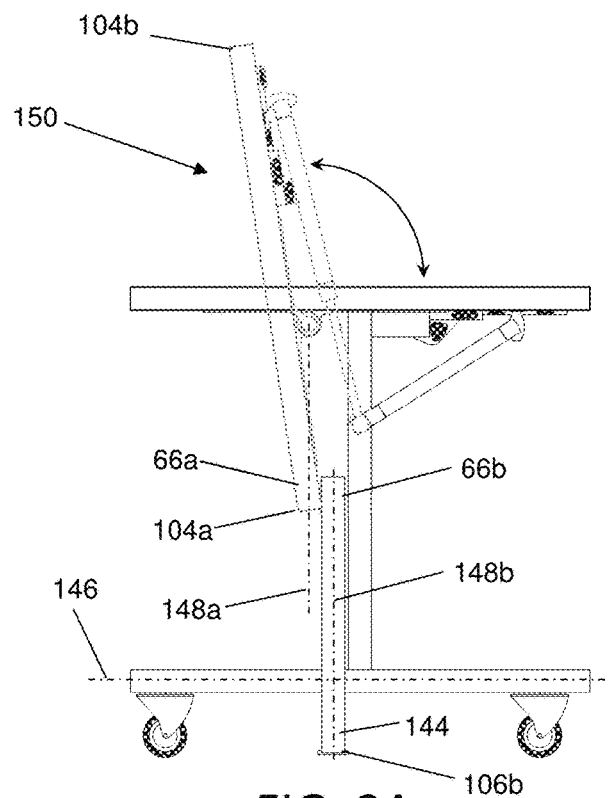
FIGS. 9A and 9B are side views of alternative embodiments of the ballistic shielding table particularly suited to protect against shrapnel blasted from explosive devices as well as bullets fired from guns.
Figure 9B:
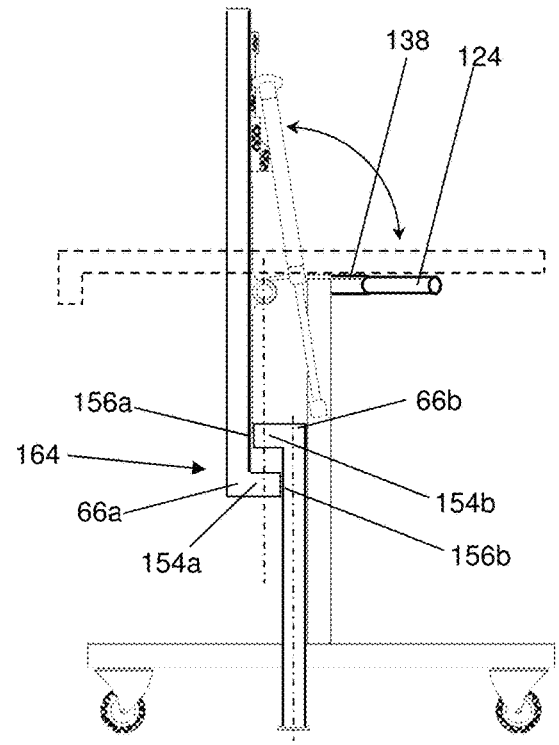

In the embodiments shown in FIGS. 9A and 9B, the upper section of the modesty panel and the tabletop section contact one another without necessarily aligning the pivot axis 148*a* of the tabletop with the axis 148*b* of the modesty panel. Instead, the tabletop may pivot past vertical 150 as shown in FIG. 9A wherein the rear edge of the tabletop is forward of the pivot axis and the front edge of the tabletop is rearward of the pivot axis and in contact with the upper section of the modesty panel. In the preferred embodiment it will be appreciated that the tabletop is substantially parallel to the floor in the working position and need only rotate to slightly past ninety degrees to move the rear edge forward of the pivot axis and bring the front edge into contact with the modest panel. However, where alternative embodiments may include tabletops at various angles in the working position, a person having an ordinary skill in the art will appreciate that the minimum degree of rotation may vary relative to the angle of the table in the working position, size of the tabletop and modestly panel and position of the pivot axis.

Rather than rotating the tabletop past vertical as described above, the upper section of the modesty panel and the tabletop section can be brought into contact with one another to form a single shield face by providing standoff aprons 154 that respectively abut opposing surfaces of the tabletop and modesty panel as shown in FIG. 9B. In this alternative embodiment the tabletop rotates into a substantially vertical position yet a single shield surface devoid of any gaps and spaces between the modesty panel and tabletop is still created by the respective standoffs. As shown, one protruding apron section 154*a* is provided on the underside front edge of the tabletop and another apron 154*b* protrudes from the front surface of the modesty panel along the top edge. Thus, when the tabletop rotates into the shield position, the standoff aprons respectively abut the front tabletop section 156*a* and the upper modesty panel 156*b* of the tabletop to provide a gap free shield. Although the embodiment in FIG. 9B depicts aprons on both the underside of the table top and the front side of the modesty panel, it will also be appreciated that a gap free shield may also be created by providing a single apron on either the tabletop or modesty panel.

Figure 10A:
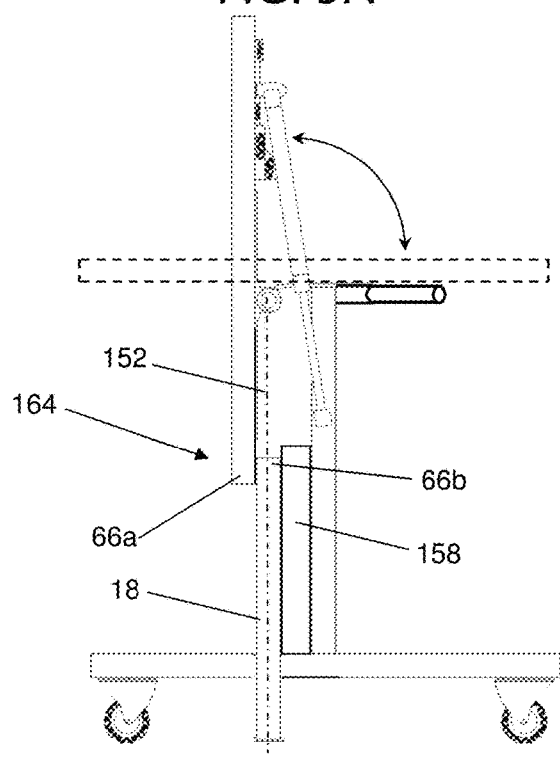
FIGS. 10A and 10B are side views of additional alternative embodiments of the ballistic shielding table particularly suited to protect against shrapnel blasted from explosive devices as well as bullets fired from guns.
Figure 10B:
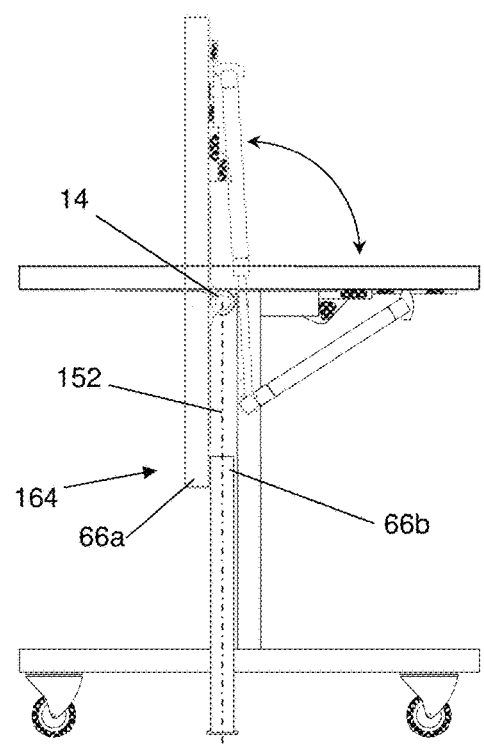

Further still, a solid shield without any breaks, slots or apertures between the tabletop and the modesty panel may be provided by situating the pivot axis and the vertical axis of the modesty panel within the same plane 152 as shown in FIGS. 10A and 10B. Accordingly, when the tabletop is rotated into the shielding position as described herein, the section of the tabletop along the front edge abuts the top section of the modesty panel and a solid shield is formed. As shown in FIG. 10A, aligning the pivot axis and the vertical axis of the modesty panel can be accomplished by moving the modesty panel towards the front of the longitudinal supports until it is beneath the pivot axis with a spacer 158. Similarly, as shown in FIG. 10B, the same effect can be accomplished by moving the pivot assembly rearward and/or the leg forward until the pivot axis and the modesty panel's vertical axis are aligned in the same plane so that the tabletop's front edge contacts the modesty panel's top section when the tabletop rotates into its shielding position.

In another aspect of the inventive flip-top table described herein, telescoping legs 160 may be provided that allow a user to raise and lower the tabletop surface relative to the lower portion of the frame. In FIGS. 8A and 8B, telescoping legs are shown with fasteners 162 that hold the slidable upper section of each leg at a particular height relative to the fixed lower section of each leg. The fastener can be a bolt or spring-loaded push button that extends between apertures in the upper section and lower section of the legs when they are aligned. It will also be appreciated that a manual crank or an electrically powered actuator can be used to move the upper sections of the legs relative to the lower sections of the legs, and set screws can be used to adjust and level the pitch of the tabletop. As best shown in FIGS. 6, 9 and 10, regardless of the structures used for adjusting the height of the tabletop with the telescoping legs, there is at least some overlap between the front section of the tabletop and the top section of the modesty panel when the tabletop is rotated into the shielding position and the legs are in their most extended orientation. Accordingly, telescoping legs can be integrated within the invention described herein and still allow for the tabletop and modesty panel to act as an effective ballistic shield so long as the telescoping range does not raise the front edge of the tabletop above the top edge of the modesty panel when in the shielding position. To maintain the ballistic protection of the present invention, when the tabletop is rotated into the shielding position, its front edge extends downward at least as far as top edge of the modesty panel when the telescoping legs are in their most extended position.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, although the present invention is disclosed with reference to a flip-top table, it will be appreciated that aspects of the present invention can be incorporated into other types of furniture, such as a podium, lectern, or pulpit, a counter at a convenience store, bank, or other place of business where persons handling money are vulnerable to attack, or a bar-top. In particular, in addition to having a rotating top, a free-standing podium may have side panels that rotate outward, and although there may not be any need for lift assistance to rotate the side panels outward, the lift speed restrictor may be important to prevent the podium from toppling over when the sides are swung out. Thus, the breadth and scope of the present invention should not be limited by any of the above-described exemplary embodiments, but should be defined only in accordance with the following claims appended hereto and their equivalents.

What is claimed is:

1. A projectile resistant table, comprising:
   a frame comprising a first leg, a second leg, and a base, wherein the first leg and the second leg each have a proximal end and a distal end, and wherein the base is comprised of a first longitudinal support and a second longitudinal support connected to the distal ends of first leg and the second leg, respectively;
   a pivot assembly attached to the frame, wherein the pivot assembly rotates about a pivot axis;
   a tabletop comprising a tabletop body, a topside, and an underside, wherein the tabletop body comprises a front edge and a rear edge, wherein the pivot assembly is connected to the tabletop body through the underside of the tabletop, wherein the tabletop rotates with the pivot assembly about the pivot axis between a working position and a shielding position, wherein the tabletop is substantially parallel to the first longitudinal support and the second longitudinal support in the working position, and wherein the tabletop is substantially parallel to the first leg and the second leg in the shielding position;
   a modesty panel having a panel body, a front surface, a rear surface, a first side, and a second side, wherein the panel body comprises a top edge and a bottom edge, wherein the panel body laterally extends between the first side and the second side, and wherein the front edge of the tabletop body overlaps at least a portion of the top edge of the modesty panel body in the shielding position; and
   a ballistic shield identifier, wherein the ballistic shield identifier is a set of visual indicators provided in a plurality of different orientations at a plurality of different heights, wherein a first visual indicator has a first orientation at a first height on the tabletop in the working position, and wherein a second visual indicator has a second orientation at a second height on the modesty panel that is askew from the first orientation and lower than the first height.

2. The table of claim 1, further comprising a lift speed restrictor operatively connected between the frame and the tabletop, wherein the lift speed restrictor limits a lift speed as the tabletop rotates between the working position and the shielding position.

3. The table of claim 2, wherein the table is positioned on a floor, wherein a bottom edge of the modesty panel is located proximate to the floor within a thickness of the tabletop at least when the tabletop is in the shielding position, wherein the lift speed restrictor further comprises a first restrictor end, a second restrictor end, and a biasing mechanism, wherein the first restrictor end is connected to the first leg, wherein the second restrictor end is connected to the underside of the tabletop, wherein the biasing mechanism biases the tabletop towards the shielding position, and wherein the biasing mechanism is at least one of a pneumatic actuator, a spring actuator, and an electric actuator.

4. The table of claim 1, wherein the first side and the second side of the modesty panel are connected to the first leg and the second leg along the rear surface, respectively, wherein a bottom edge of the modesty panel is located below the distal ends of the first leg and the second leg when the tabletop is in the working position and in the shielding position, wherein the pivot axis is positioned forward of a front surface of the modesty panel, wherein a rear edge of the tabletop rotates upwards from the working position to the shielding position, and wherein the topside of the tabletop rotates forward of a front side of the frame and the front surface of the modesty panel in the shielding position.

5. The table of claim 1, further comprising a locking mechanism having a locked configuration holding the tabletop in the working position and an unlocked configuration releasing the tabletop to rotate to the shielding position, wherein the working position of the tabletop is substantially horizontal, wherein the shielding position of the tabletop is substantially vertical or past vertical, wherein the locking mechanism is situated below the underside of the tabletop and comprises a latch, a catch and a handle, and wherein a bottom edge of the modesty panel is located below the distal ends of the first leg and the second leg at least when the tabletop is in the shielding position.

6. The table of claim 5, wherein the frame further comprises a crossbeam, wherein the crossbeam connects to and laterally extends between the proximal ends of the first leg and the second leg, wherein the catch connects to the crossbeam at a fixed end and extends a distance from the crossbeam to a free end, wherein the latch engages the free end of the catch in the locked configuration when the tabletop is in the working position and prevents the tabletop and the pivot assembly from rotating, wherein the handle is located behind the rear surface of the modesty panel between the rear side of the frame and the rear edge of the tabletop in the working position and operatively engages the latch, and wherein the latch disengages from the free end of the catch in the unlocked configuration and permits the pivot assembly and tabletop to rotate about the pivot axis to the shielding position.

7. The table of claim 1, wherein the modesty panel further comprises an upper modesty panel section proximate to the top edge and a bottom modesty panel section proximate to the bottom edge, wherein the underside of the tabletop further comprises a front tabletop section proximate to the front edge, wherein the bottom edge of the modesty panel is situated below the first longitudinal support and the second longitudinal support at least in the shielding position, and wherein the front tabletop section is positioned adjacent to the upper modesty panel section within a thickness of the tabletop in the shielding position.

8. The table of claim 1, further comprising a set of casters mounted proximate to opposite ends of the first longitudinal support and the second longitudinal support, wherein each of the casters in the set of casters has a wheel axis, and wherein a bottom edge of the modesty panel is situated below the wheel axis for each of the casters.

9. The table of claim 8, wherein the set of casters have a third visual indicator with a third orientation that is askew from at least one of the first orientation and the second orientation and a third height that is lower than the second height, wherein the first visual indicator is located on a back perimeter edge of the tabletop, wherein the second visual indicator is located on a top perimeter edge of the modesty panel, wherein the ballistic shield identifier is selected from the group of visual indicators consisting of a color indicator, a word indicator, a shape indicator, and any combination thereof, wherein the set of caster is further comprised of a set of front casters and a set of rear casters, wherein the set of front casters is mounted proximate to a front end of each of the first longitudinal support and the second longitudinal support, wherein each of the front casters has no caster locking mechanism, wherein the set of rear casters is mounted proximate to a rear end of each of the first longitudinal support and the second longitudinal support, and wherein each of the rear casters has a caster locking mechanism.

10. The table of claim 1, further comprising a safety box positioned below the underside of the tabletop, wherein the safety box is mounted to at least one of the frame, the tabletop, and the modesty panel, wherein the safety box is located above the bottom edge of the modesty panel, and wherein the safety box is accessible from a rear side of the frame when the tabletop is in the working position and in the shielding position.

11. A projectile resistant table, comprising:
a frame comprising a first leg, a second leg, and a base, wherein the base is comprised of a first longitudinal support and a second longitudinal support connected to the distal ends of first leg and the second leg, respectively, and wherein the frame has a front side and a rear side;
a pivot assembly attached to the frame, wherein the pivot assembly rotates about a pivot axis;
a tabletop comprising a tabletop body, a topside, and an underside, wherein the tabletop body comprises a front edge and a rear edge, wherein the pivot assembly is connected to the tabletop body through the underside of the tabletop, wherein the tabletop rotates with the pivot assembly about the pivot axis between a working position and a shielding position, wherein the tabletop is substantially horizontal in the working position, and wherein the tabletop is substantially vertical or past vertical in the shielding position;
a modesty panel having a panel body, a front surface, a rear surface, a first side, and a second side, wherein the panel body comprises a top edge and a bottom edge, wherein the panel body laterally extends between the first side and the second side, and wherein a portion of the front edge of the tabletop body overlaps the top edge of the modesty panel body forward of the front surface in the shielding position; and
a set of casters mounted proximate to opposite ends of the first longitudinal support and the second longitudinal support, wherein each of the casters in the set of casters has a wheel axis, and wherein a bottom edge of the modesty panel is situated below the wheel axis for each of the casters at least when the tabletop is in the shielding position.

12. The table of claim 11, further comprising a lift speed restrictor operatively connected between the frame and the tabletop, wherein the lift speed restrictor limits a lift speed as the tabletop rotates between the working position and the shielding position, wherein the tabletop has a front edge and a rear edge, wherein a first distance between the rear edge and the pivot axis is greater than a second distance between the front edge and the pivot axis, and wherein the rear edge rotates upwards and forward of the front side of the frame in the shielding position.

13. The table of claim 11, wherein the modesty panel further comprises an upper modesty panel section proximate to the top edge and a bottom modesty panel section proximate to the bottom edge, wherein the underside of the tabletop further comprises a front tabletop section proximate to the front edge, and wherein the bottom edge and the bottom modesty panel section are situated below the first longitudinal support and the second longitudinal support at least when the tabletop is in the shielding position.

14. The table of claim 13, further comprising a locking mechanism having a locked configuration holding the tabletop in the working position and an unlocked configuration releasing the tabletop to rotate to the shielding position, wherein the locking mechanism is situated below the underside of the tabletop and is comprised of a latch, a catch and a handle, and wherein the front tabletop section contacts the upper modesty panel section in the shielding position.

15. The table of claim 11, further comprising a ballistic shield identifier, wherein the ballistic shield identifier is a set of visual indicators provided in a plurality of different orientations at a plurality of different heights, wherein a first visual indicator has a first orientation at a first height on the tabletop in the working position, wherein a second visual indicator has a second orientation at a second height on the modesty panel that is askew from the first orientation and lower than the first height, wherein the ballistic shield identifier is selected from the group of visual indicators consisting of a color indicator, a word indicator, a shape indicator, and any combination thereof, wherein the frame further comprises a crossbeam extending between and connected to the first leg and the second leg, wherein the pivot axis is offset a distance from the crossbeam at the front side of the frame, wherein the first side and the second side of the modesty panel are connected to the first leg and the second leg along the rear surface, respectively, wherein the catch connects to the crossbeam at a fixed end and extends a distance from the crossbeam to a free end, wherein the latch engages the free end of the catch in the locked configuration when the tabletop is in the working position and prevents the tabletop and the pivot assembly from rotating, wherein the handle is located behind the rear surface of the modesty panel between the rear side of the frame and the rear edge of the tabletop in the working position and operatively engages the latch, and wherein the latch disengages from the free end of the catch in the unlocked configuration and permits the pivot assembly and tabletop to rotate about the pivot axis to the shielding position.

16. A projectile resistant table, comprising:
a frame comprising a plurality of legs and a base, wherein each of the legs has a proximal end and a distal end, wherein the base is comprised of a first longitudinal support and a second longitudinal support connected to the distal ends of the legs, wherein each of the legs extends from the proximal end at a height above the base to the distal end connected to the base proximate to a floor surface, and wherein the frame has a front side and a rear side;
a pivot assembly attached to the frame, wherein the pivot assembly rotates about a pivot axis;
a tabletop comprising a tabletop body, a topside, and an underside, wherein the tabletop has a thickness between the topside and the underside, wherein the pivot assembly is connected to the tabletop body through the underside of the tabletop, wherein the tabletop rotates with the pivot assembly about the pivot axis between a working position and a shielding position, wherein the tabletop is substantially horizontal in the working position, and wherein the tabletop is substantially vertical in the shielding position;
a modesty panel having a panel body, a first side, and a second side, wherein the panel body laterally extends between the first side and the second side, wherein a bottom edge of the modesty panel is below the distal end of the legs and is spaced from the floor surface by a distance that is less than the thickness of the tabletop at least when the tabletop is in the shielding position, and wherein a portion of the tabletop body overlaps a top edge of the modesty panel body in the shielding position; and
a locking mechanism having a locked configuration holding the tabletop in the working position and an unlocked configuration releasing the tabletop to rotate to the shielding position, wherein the locking mechanism is situated below the underside of the tabletop and comprises a latch, a catch and a handle.

17. The table of claim 16, wherein the pivot axis is positioned forward of a front surface of the modesty panel, wherein a rear edge of the tabletop rotates upwards from the working position to the shielding position, and wherein the topside of the tabletop rotates forward of the front side of the frame and the front surface of the modesty panel in the shielding position.

18. The table of claim 16, further comprising a lift speed restrictor operatively connected between the frame and the tabletop, and wherein the lift speed restrictor limits a lift speed as the tabletop rotates between the working position and the shielding position.

19. The table of claim 16, wherein the frame further comprises a crossbeam, wherein the crossbeam connects to and laterally extends between the proximal ends of the legs, wherein the first side and the second side of the modesty panel are respectively connected to the legs, wherein the catch connects to the crossbeam at a fixed end and extends a distance from the crossbeam to a free end, wherein the latch engages the free end of the catch in the locked configuration, wherein the handle is located behind a rear surface of the modesty panel between the rear side of the frame and a rear edge of the tabletop in the working position and is operatively connected to the latch, and wherein the latch disengages from the free end of the catch in the unlocked configuration.

20. The table of claim 16, further comprising a set of casters mounted proximate to opposite ends of the first longitudinal support and the second longitudinal support, wherein each of the casters in the set of casters has a wheel axis, and wherein the bottom edge of the modesty panel is situated below the wheel axis for each of the casters at least when the tabletop is in the shielding position.

* * * * *